United States Patent
Seydoux et al.

(10) Patent No.: US 6,263,216 B1
(45) Date of Patent: Jul. 17, 2001

(54) RADIOTELEPHONE VOICE CONTROL DEVICE, IN PARTICULAR FOR USE IN A MOTOR VEHICLE

(75) Inventors: Henri Seydoux; Nicolas Besnard, both of Paris (FR)

(73) Assignee: Parrot, Paris (FR)

( * ) Notice: Subject to any disclaimer, the term of this patent is extended or adjusted under 35 U.S.C. 154(b) by 0 days.

(21) Appl. No.: 09/411,382

(22) Filed: Oct. 4, 1999

Related U.S. Application Data

(63) Continuation of application No. PCT/FR98/00687, filed on Apr. 3, 1998.

(30) Foreign Application Priority Data

Apr. 4, 1997 (FR) .................................................. 97 04168

(51) Int. Cl.$^7$ ...................................................... H04B 1/38
(52) U.S. Cl. ......................... 455/564; 455/563; 704/241; 704/246; 704/233; 379/88.02; 379/88.03
(58) Field of Search ........................... 455/79, 563, 67.7, 455/414, 564; 704/241, 246, 248, 250, 333, 226, 227, 228, 275, 253; 379/88.01, 88.02, 88.03

(56) References Cited

U.S. PATENT DOCUMENTS 4,426,733 * 1/1984 Brenig ..................................... 455/79
4,644,107 * 2/1987 Clowes et al. ........................ 379/354

(List continued on next page.)

OTHER PUBLICATIONS

Patent Abstracts of Japan, Pub. No. 03003540, "Voice Command Type Automobile Telephone Set" (1991).
Patent Abstracts of Japan, Pub. No. 02056600, "Speech Dialing System" (1990).
Strope et al, "A model of dynamic auditory perception . . .," XP–002055580, Elec. Engineering Department, UCLA (1996).

*Primary Examiner*—Dwayne Bost
*Assistant Examiner*—Sonny Trinh
(74) *Attorney, Agent, or Firm*—Nixon & Vanderhye P.C.

(57) ABSTRACT

The apparatus comprises a data memory containing a series of correspondents' call numbers and, for each call number, at least one associated voice print; a sound transducer suitable for picking up the name of a desired corespondent as spoken by the user of the apparatus; voice recognition means suitable for analyzing the correspondent's name as picked up by the transducer and for transforming it into an associated voice print; selective memory addressing means including associative means suitable for finding a voice print in the memory corresponding to the print supplied by the voice recognition means, and in the event of a match, for addressing the corresponding memory position; and means co-operating with the associative means for applying the addressed call number to the radiotelephone circuits. The voice recognition means evaluate and store a current noise level as picked up by the transducer in the absence of a speech signal; when in the presence of a speech signal, they subtract the previously evaluated current noise level from the signal as picked up; and then they apply the resulting signal as obtained in this way to a DTW type voice recognition algorithm with pattern recognition by dynamic programming adapted to speech using dynamic parameter extraction functions, in particular a predictive dynamic algorithm with forward and/or backward and/or frequency masking.

3 Claims, 2 Drawing Sheets

U.S. PATENT DOCUMENTS

| | | | | |
|---|---|---|---|---|
| 4,731,811 | * | 3/1988 | Dubus | 455/563 |
| 4,737,976 | * | 4/1988 | Borth et al. | 455/563 |
| 4,757,517 | * | 7/1988 | Yatsuzuka | 375/245 |
| 4,797,929 | * | 1/1989 | Gerson et al. | 704/243 |
| 4,805,219 | * | 2/1989 | Baker et al. | 704/241 |
| 4,852,146 | * | 7/1989 | Hathcock et al. | 455/564 |
| 4,870,686 | * | 9/1989 | Gerson et al. | 704/234 |
| 4,945,557 | * | 7/1990 | Kaneuchi et al. | 379/67 |
| 4,961,212 | * | 10/1990 | Marui et al. | 379/67 |
| 5,007,081 | * | 4/1991 | Schmuckal et al. | 379/354 |
| 5,042,063 | * | 8/1991 | Sakanishi et al. | 379/88.03 |
| 5,131,029 | * | 7/1992 | Kunstadt | 379/355 |
| 5,222,121 | * | 6/1993 | Shimada | 379/88.03 |
| 5,430,791 | * | 7/1995 | Feit et al. | 379/67 |
| 5,452,340 | * | 9/1995 | Engelbeck et al. | 379/88.03 |
| 5,524,169 | * | 6/1996 | Cohen et al. | 704/231 |
| 5,584,052 | | 12/1996 | Gulau et al. . | |
| 5,774,841 | * | 6/1998 | Salazar et al. | 704/225 |
| 5,790,652 | * | 8/1998 | Gulley et al. | 379/368 |
| 5,802,149 | * | 9/1998 | Hanson | 379/88.03 |
| 5,805,672 | * | 9/1998 | Barkat et al. | 379/88.03 |
| 5,912,949 | * | 6/1999 | Chan et al. | 379/88.03 |

* cited by examiner

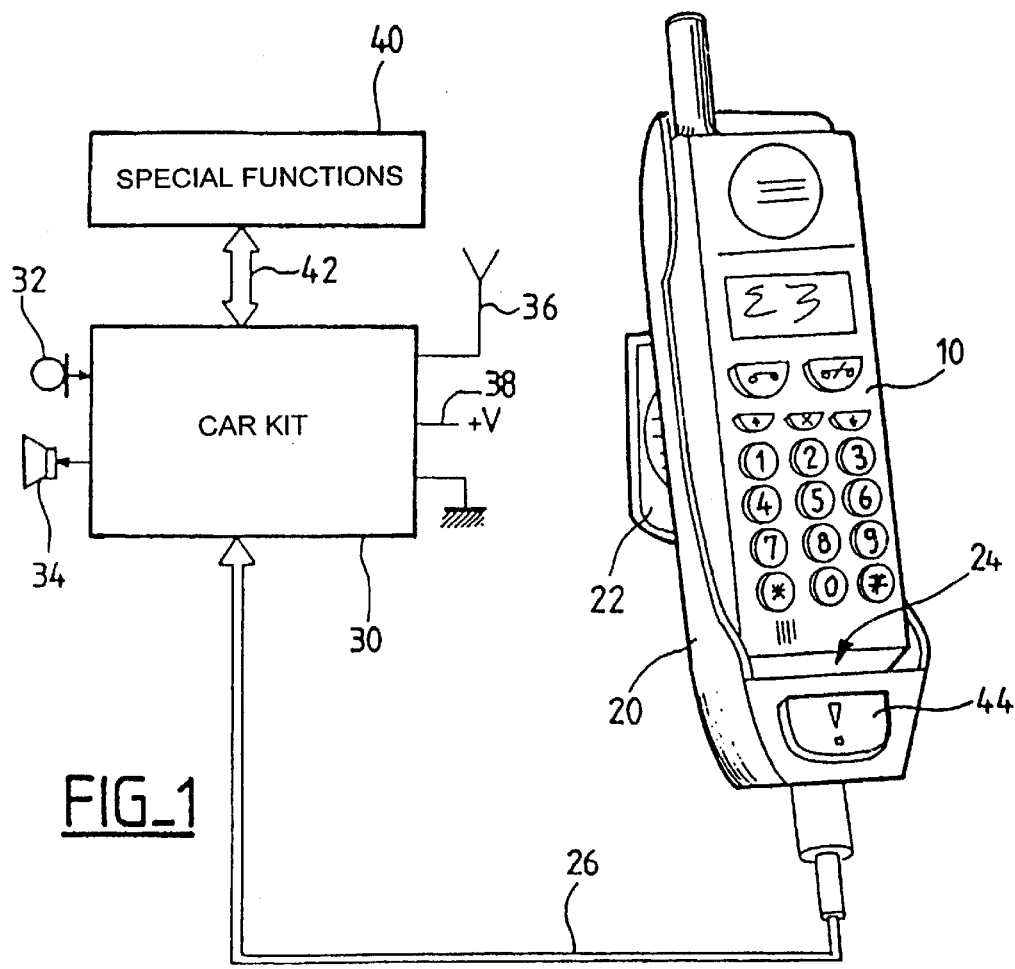
FIG_1
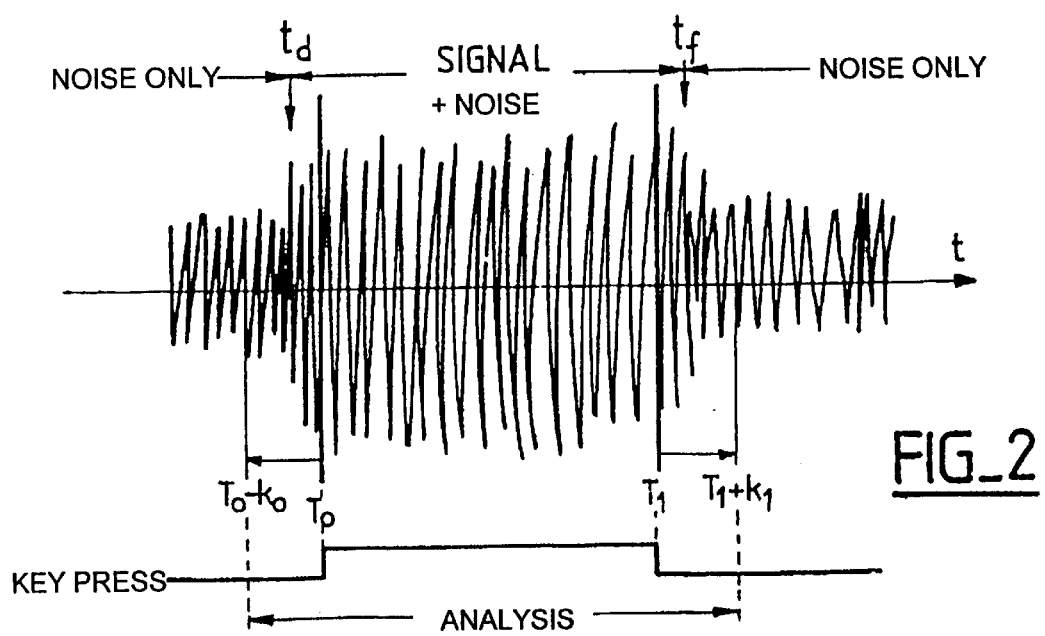
FIG_2

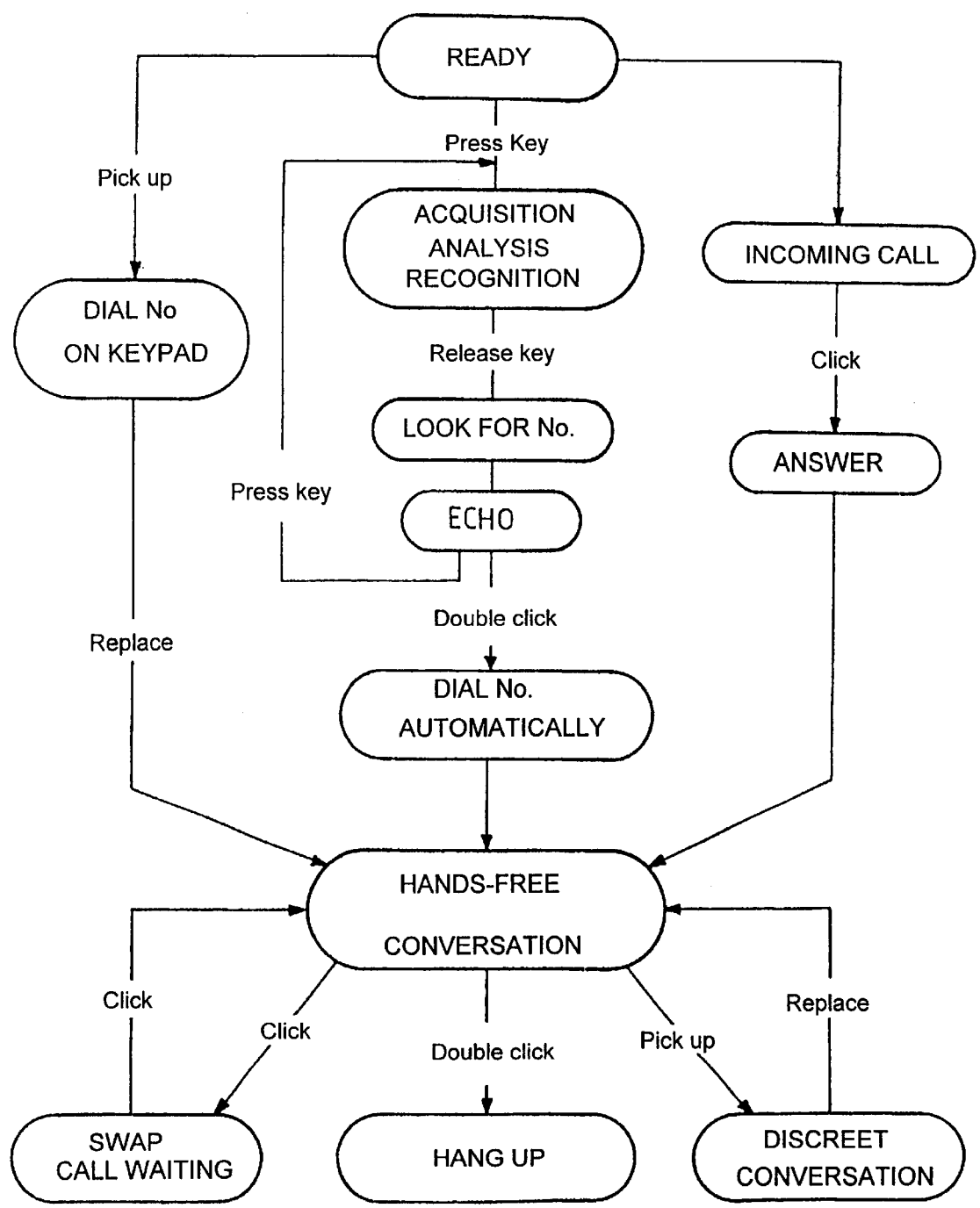
FIG_3

RADIOTELEPHONE VOICE CONTROL DEVICE, IN PARTICULAR FOR USE IN A MOTOR VEHICLE

This application is a continuation of PCT/FR98/00687 filed Apr. 3, 1998.

BACKGROUND OF THE INVENTION

1. Field of the Invention

The present invention relates to the field of accessories for radiotelephones.

It relates more particularly to using radiotelephones in a car, which imposes particular human factors difficulties, given the manifest safety constraints when such an appliance is used in a moving vehicle.

2. Discussion of Prior Art

A particular object of the invention is to enable automatic number-dialing means for the radiotelephone to be used under voice control in a vehicle.

The radiotelephones available on the market all have systems constituting a directory and telephone dialer, is however those systems require keys to be pressed, menus to be scrolled on the screen of the display, etc., thereby making them difficult to use in practice in a vehicle.

EP-A-0 650 283 describes a self-contained portable appliance forming a directory and telephone dialer and including in particular voice recognition means suitable for analyzing a name spoken into a microphone, for addressing a call number memory to find the number associated with the correspondent whose name has been spoken, and then producing a sequence of voice frequency tones (DTMF signals) corresponding to the various digits of the number found in that way.

U.S.Pat. No. 4,737,976 teaches apparatus of that type integrated in a car radiotelephone, in particular to enable it to be used in a "hands-free" mode of operation, without it being necessary to take hold of the handset to dial the number.

When it is desired to proceed in that way, a first difficulty is the high level of noise in a vehicle cabin. In particular, if it is desired to use the appliance in "hands-free" mode without detaching it from its support, the large distance between the microphone and the user gives rise to a relatively high level of noise which makes it difficult to extract a useful signal buried in the noise.

For that purpose, above-mentioned U.S. Pat. No. 4,737, 976 proposes providing a dynamic noise suppressor stage operating by spectral subtraction upstream from the voice recognition proper. In practice, that apparatus presents only limited performance when it is desired to achieve fine recognition (e.g. in a file of voice signatures containing several tens of references, or even more than a hundred references) and to do so in very noisy surroundings, typical of the environment of a car, with spectral characteristics that are not stationary, i.e. which vary in unpredictable manner as a function of driving conditions (driving over bumpy roads or on paving stones, car radio in operation, etc.).

Another difficulty, still when it is desired to use the appliance without detaching it from its support, stems from the fact that the appliance must be very ergonomic to use since it will generally be too far away for the user to be able to read the messages on the display of the radiotelephone or to press on such and such a key of its keypad, or at least the user will not be able to do so in a manner that is not dangerous for driving, if the vehicle is moving.

These two major constraints (high noise level and the search for excellent human factors) have not succeeded up to the present in enabling a radiotelephone to be used in a completely "hands-free" configuration in a vehicle in a manner that is satisfactory for the user and for driving safely.

SUMMARY OF THE INVENTION

The invention proposes solving this difficulty, by presenting a novel radiotelephone accessory which enables the radiotelephone to be used in an entirely "hands-free" mode in a manner that is both reliable (good signal extraction in spite of high noise level), simple, and safe (by in-depth ergonomic design).

It is shown in particular that it is possible to achieve excellent human factors by keeping controls down to a single key (which may optionally be replaced by any one of the buttons of the radiotelephone), while still enabling a large number of functions to be operated in relatively intuitive manner, without requiring irksome training on the part of the user.

More precisely, the invention provides voice control apparatus for a radiotelephone, in particular for use in a motor vehicle, the apparatus comprising: a data memory containing a series of correspondents' call numbers and, for each call number, at least one associated voice print; a sound transducer suitable for picking up the name of a desired corespondent as spoken by the user of the apparatus; voice recognition means suitable for analyzing the correspondent's name as picked up by the transducer and for transforming it into an associated voice print; selective memory addressing means including associative means suitable for finding a voice print in the memory corresponding to the print supplied by the voice recognition means, and in the event of a match, for addressing the corresponding memory position; and means co-operating with the associative means for applying the addressed call number to the radiotelephone circuits.

According to the invention, the voice recognition means: evaluate and store a current noise level as picked up by the transducer in the absence of a speech signal; when in the presence of a speech signal, they subtract the previously evaluated current noise level from the signal as picked up; and then they apply the resulting signal as obtained in this way to a DTW type voice recognition algorithm with pattern recognition by dynamic programming adapted to speech using dynamic parameter extraction functions, in particular a predictive dynamic algorithm with forward and/or backward and/or frequency masking.

According to various advantageous characteristics:

- the device comprises a key actuated by the user to mark a speech signal, and the signal picked up by the transducer is stored continuously over a given time interval so as to perform voice recognition over a length of time including the period during which said key is actuated plus said time interval immediately preceding said actuation;
- the device comprises a key actuated by the user to mark a speech signal, and voice recognition is performed over a length of time terminating after the end of actuation of the key;
- the device comprises a key actuated by the user and whose actuation controls radiotelephone control functions including answering, hanging up, and swapping during call waiting;
- the device comprises means for reading at least one internal directory of the radiotelephone, for comparing the call numbers in said directory with those in said memory, for updating said memory by adding thereto the call numbers in the directory which are missing therefrom, for causing the user to speak the names of the correspondents associated with the added numbers, and for storing the voice prints of said names; and in a confirmation stage, the apparatus identifies and conserves in memory voice prints associated with the corespondents' names in the memory or with words of a vocabulary of specific voice commands, whenever the voice prints give rise to successful voice recognition.

BRIEF DESCRIPTION OF THE DRAWINGS

An embodiment of the invention is described below with reference to the accompanying drawings.

FIG. 1 is a diagram of the radiotelephone on its support and the functional electronics blocks associated therewith.

FIG. 2 is a timing chart for use in describing the time sequences when analyzing the signal picked up by the microphone.

FIG. 3 is a state diagram showing how the various operations performed by the apparatus of the invention follow one another as a function of actions performed by the user.

DETAILED DISCUSSION OF PREFERRED EMBODIMENTS

The invention is described below in the form of an add-on circuit interfaced to a car adaptor for a radiotelephone: the radiotelephone is a portable appliance placed on a support in the vehicle and placing the radiotelephone on the support causes various circuits to be connected, in particular for "hands-free"-operation, connection to an antenna, power supply from the vehicle power supply system, etc.

However this configuration is not limiting. The invention can also be implemented with a "car" radiotelephone, where various radiotelephone stages are permanently installed in the vehicle with a handset being made available to the driver, or indeed with a "hands-free" installation that is partially or completely integrated in the vehicle on manufacture. The circuits associated with the "hands-free" telephone can also be integrated in full or in part in the car radio (the telephone display then being replaced by a display on the front face of the car radio or on the vehicle dashboard) or in a computer on board the vehicle.

Similarly, although in-car use is the main use intended for the invention, such use is not limiting and the invention can be used in other circumstances, given the invention's performance against noise and its good human factors. In particular, the invention can be applied to portable radiotelephones so as to improve the performance thereof in a noisy environment and so as to make them simpler to use, in particular for repetitive use, for people unfamiliar with how to operate such appliances, for handicapped persons, for heavy users, etc.

In the embodiment shown, a portable radiotelephone 10, constituted by a conventional and unmodified model, typically a 2 watt GSM model, is placed in a support comprising a cradle 20 that receives the radiotelephone 10 and that is fixed, for example, to the vehicle dashboard by an appropriate support 22. In its bottom portion 24, the cradle 20 includes, in conventional manner, connectors giving access to a data bus and to various circuits (antenna, power supply, etc.) of the radiotelephone so as to connect the radiotelephone via a cable 26 to a vehicle adaptor or "car kit" 30.

The adaptor 30 is itself of conventional type and is not described in detail. It is connected to a microphone 32 and to a loudspeaker 34 serving to perform the "hands-free" function, to an optional external antenna 36, and to a power supply line 38 connected to the power supply system of the vehicle.

This known type of adaptor is associated with a specific add-on circuit 40 for implementing the functions of the invention as described below.

The circuit 40 combines the various items of hardware and software that enable the functions of the invention to be implemented, which items are referred to below for simplicity as "the apparatus" regardless of the specific practical form of embodiment used.

The circuit 40 is connected to the adaptor 30 via an interface bus 42 comprising:

a microphone link 32;

a loudspeaker link 34;

ground and power supply lines;

a serial digital link to the GSM circuit (via the cable 26); and a link to a control key.

The last-mentioned control key is advantageously a key such as that referenced 44 placed on the cradle 20 and connected to the circuit 40 via the cable 26.

Nevertheless, this disposition is not essential: the key 44 could be situated at some other location where it is convenient for use by the driver, e.g. it could be integrated in the dashboard, the steering wheel, one of the controls on the steering column, a foot control, etc.

Indeed, this specific key is not in itself essential: it is possible in a variant or in addition, to make use of any one of the keys of the radiotelephone to perform the same functions. It can be seen below that when the radiotelephone is placed on its cradle, the keys of its keypad are not used, so while the appliance is placed on its support, it suffices to redefine the keypad by giving all of the keys of the radiotelephone the same function, i.e. the function of the specific key 44 (when the appliance is taken from its cradle, the keypad returns to normal operation with each of the keys having its usual specific definition). Below, such a redefinition of all of the keys of the keypad is considered as being entirely equivalent to using the specific key 44, and each time mention is made of this key, it should be understood that it could be replaced by a key of the redefined keypad.

Implementation of the functions of the invention is described below under various headings in succession:

voice recognition in a noisy environment;

"hands-free" human factors;

telephone directory management;

voice print training;

voice control of radiotelephone functions.

1) Voice recognition in a noisy environment

In a moving vehicle, the level of noise is high, and this is particularly troublesome for voice recognition used in a "hands-free" system where the distance between the mouth of the user and the microphone is large, thus allowing the microphone to pick up a large amount of noise.

Algorithms are known which make it possible to take noise into account to some extent, however those algorithms are nevertheless not adapted to such high levels of noise in which a word is "buried" in the noise, since the algorithm then requires very large computing power which is incompatible with real time voice recognition by a simple microprocessor circuit. With the quantity of noise concerned, it is generally necessary to calculate all of the pattern recognition possibilities without being able to make any "assumptions" about the beginning of the word. Since the beginnings of words cannot be estimated, those models are very difficult to use in reality because of the excessive quantity of computation that would be necessary in practice.

Thus, in Brian Strope's thesis entitled "*A model of dynamic auditory perception and its application to robust speech recognition*" (B. Strope, Master's Thesis, Department of Electrical Engineering, UCLA, 1995) it is stated: "An initial evaluation with a simple dynamic programming-based isolated word recognition system and a single talker was performed. A system was constructed that used an Itakura path constraint, and a Euclidean local distance metric excluding the undifferentiated $c_o$ term. Clean templates were isolated from surrounding silence, but test tokens were not. As more noise is added, word isolation, or endpoint detection, becomes more difficult. To assess the robustness of the system, it is therefore unrealistic to assume the temporal placement of the speech within the background noise is known".

It is then proposed to use dynamic programming for discriminating between speech and noise. However that solution implies a high level of computing power which is incompatible with voice recognition in real time as needed in the present invention.

To mitigate that limitation, the invention proposes initially estimating the noise, and then subtracting it from the signal. More precisely, noise is picked up continuously by the microphone 32 and is analyzed by the apparatus of the invention to give a weighted mean energy spectrum of the noise, which spectrum is continuously updated. When it is desired to perform voice recognition, e.g. when the key 44 has been pressed (the particular way in which a press on this key is used is described below), the apparatus analyzes the signal picked up by the microphone in the frequency domain and subtracts the previously determined and stored noise power spectrum from the power spectrum obtained in this way.

Since the noise inside a car is highly non-stationary, it is necessary to estimate its level continuously in order to track all variations therein. This estimate of the mean noise is used when performing spectrum subtraction in the speech recognition algorithm and it is essential for removing the background noise which comes in addition to the speech from the speaker.

The instant at which the key 44 is pressed and voice recognition is triggered is written $T_0$, the instant marking the end of the recognition process is written $T_1$, and a time safety margin, written $k_0$, is used to allow the speaker to speak up to $k_0$ seconds prior to $T_0$ (it is specified below how the parameters $T_0$, $k_0$, and $T_1$ are determined by the system).

Mean noise is estimated separately in 16 frequency bands and in two different modes, with the estimated noise level advantageously being readjusted during speech recognition if necessary:

a) Noise mode: this mode corresponds to the period during which voice recognition is not activated (before $T_0-k_0$ and after $T_1$). In this mode, the noise estimate is updated independently in all 16 bands with a time constant of 100 ms.

b) Voice recognition mode: this mode corresponds to the period during which voice recognition is activated (after $T_0-k_0$ and up to $T_1$). In this mode, the estimated spectral amplitude is updated in each frequency band only if its variation relative to the preceding frame does not correspond to an increase of more than 100% relative. The updating time constant is still equal to 100 ms.

By using these two modes of operation, the estimated background noise is updated not only during the non-speech period of time (before the key press that triggers speech recognition), but also in the presence of speech. This technique makes it possible to track various scenarios for changes in the level and the characteristics of the background noise, for example an increase or a decrease in speed, a change in the acoustic conditions of the car (a window or a door being opened), the car radio being turned on or off, or indeed the presence of external noises created by other cars.

With mean noise estimated in this way, it is possible to proceed with voice recognition proper.

A fundamental parameter of the speech detection algorithm is energy threshold, and it is calculated as follows:

a) the maximum of the spectral amplitude is calculated separately on each of the 16 frequency bands over the 20 most recent frames preceding $T_0-k_0$; and b) during voice recognition mode, for each frame and in each band, the estimated mean noise is subtracted from the previously calculated maximum. The energy threshold is the energy associated with the resulting 16-dimensional vector.

In other words, an energy threshold is available for distinguishing between periods of speech (noisy speech) and periods of "silence" (noisy silence). To do this, use is made of a differential shift or threshold added to the noise energy level estimated as mentioned above, so as to distinguish between speech and silence. Speech recognition can thus be triggered with varying levels of noise and the defect common to numerous speech recognition algorithms which require an arbitrary energy threshold value for the signal to discriminate between silence and speech is mitigated, given that this threshold is particularly necessary for detecting the separations between words in a succession of words spoken by the user.

More precisely, the voice recognition algorithms conventionally comprise an initial stage of extracting parameters followed by a comparison stage (recognition proper).

The improvement of the invention relates essentially to the parameter extraction stage, while the comparison stage uses known algorithms of the dynamic time warping (DTW) or the hidden Markov model (HMM) type and is not described in detail.

In the present invention, parameter extraction proceeds as follows:

a) pre-emphasis;

b) Hamming window;

c) FFT (fast Fourier transform);

d) compute the algorithm of the power;

e) putting on the Mel scale.

These five steps (a) to (e) which reflect conventional modeling of the human ear are themselves known and are not described in greater detail. In the context of the invention, they are performed continuously, e.g. by means of a suitable digital signal processor (DSP) circuit acting on the signal as picked up, regardless of whether it constitutes ambient noise or a noisy speech signal.

The following steps are then performed on the noisy speech signal:

f) noise subtraction (a step specific to the invention, see above);

g) masking calculation, e.g. using a predictive dynamic algorithm with forward and/or backward and/or frequency masking; such an algorithm is described, for example, by Brian Strope and Abeer Alwan, "A model of dynamic auditory perception and its application to robust speech recognition", *Proceedings of the IEEE ICASSP* 1996, Vol. 1, pp. 37–40 which describes a forward masking characteristic representative of a dynamic psycho-acoustic model of human hearing;

h) calculation of the cepstrum (cosine transform of the spectrum);

i) calculation of spectrum contrast; and j) extraction of the more significant parameters from the cepstrum.

As already mentioned above, to distinguish between periods of (noisy) "silence" and periods of speech, a press on the key 44 can serve to inform the apparatus of the invention without ambiguity that it is time to proceed with voice control analysis, with this triggering by means of the key coming in addition to or as a variant of automatic recognition based on the energy threshold, as mentioned above.

EP-A-0 650 283 describes a comparable mode of operation: it relates to a directory/dialer with speech recognition which is used by speaking the name of the desired corespondent into a microphone after pressing on a pushbutton. The appliance then searches its data memory for a "voice print" resembling the utterance and it presents an associated telephone number on a display while simultaneously causing the loudspeaker to utter the voice print by voice synthesis, as an "echo". If the voice print reproduced as an echo is indeed the desired name, then the user double-clicks on the pushbutton, which has the effect of generating a sequence of voice frequency tones (DTMF) for dialing the number in question.

In other words, the operating sequence is as follows: press the key . . . speak the name to be recognized . . . release the key . . . listen to the echo . . . double-click to confirm and dial the number.

Or in a variant: click on the key . . . speak the name to be recognized . . . listen to the echo . . . double-click to confirm and dial the number (the instant marking the end of signal acquisition being determined internally by the voice recognition algorithm).

Such a sequence can be used in the context of the apparatus of the invention.

Nevertheless, it can be further improved. More particularly, with a vehicle driver paying more attention to driving than to controlling the telephone, it can be difficult for the driver to synchronize the key press (and where appropriate key release) appropriately with speaking the word to be recognized. Many users are nervous and start speaking before they press the key; similarly, users often release the key before they have finished speaking the word. A few fractions of a second of offset between the key press (and where appropriate key release) and the utterance of the word to be recognized suffice to disturb the operation of the apparatus severely, making correct recognition of the word uttered difficult.

To mitigate this difficulty, the invention proposes performing signal acquisition continuously, whether the signal is noisy silence (for the purpose of estimating noise level) or noisy speech, and then retaining a certain timed quantity of the signal in a memory, e.g. over one-eighth of a second.

When the user presses the key, the apparatus goes back in time and includes the one-eighth of a second preceding the key press (immediate past) in its analysis. Similarly, after the key has been released (where appropriate), the apparatus includes in its analysis the one-eighth of a second following the release of the key (immediate future). Another advantage of proceeding in this way stems from the fact that the signal is permanently available for the purpose of making a good noise approximation.

In other words, the key press (and where appropriate key release) is not considered as being a speech start signal (or stop signal), but as indicating when the start (or end) of speech is probable, and analysis must be performed not only over the period during which the key is pressed, but also over the signal fraction stored immediately before said period (and immediately after).

FIG. 2 shows the time domain of the signal as picked up corresponding to a word being spoken between a start instant $t_d$ and an end instant $t_f$.

For a user who does not correctly synchronize pressing on the key with uttering the word, the key may be pressed for example at $T_0$ and released at $T_1$.

In this case, by precaution, analysis is applied not only to the period $[T_0, T_1]$, but in fact to the period $[T_0-k_0, T_1+k_1]$ so as to be certain of covering completely the representative period $[t_d, t_f]$, where $k_0$ and $k_1$ can be equal or different, and are typically of the order of a fraction of a second, e.g. $k_0=k_1=$one-eighth of a second.

Three states can be distinguished:

the ignition key is not in place: the apparatus of the invention is inactive;

the ignition is on: the apparatus is in acquisition mode and continuously conserves the most recent one-eighth of a second of the signal. From this stored signal, the apparatus evaluates noise and updates the corresponding level by replacing the previously stored period of signal with a new one. As mentioned above, this estimation of noise makes it possible to improve the performance of the recognition algorithm considerably, and the fact of pressing on the key enables easy discrimination of external origin between noise and speech, thereby greatly improving the effectiveness of the algorithm.

In the implementation described above, the user is required to hold the key pressed down throughout the time it takes to utter the word, and two transitions in key contact are therefore used to define the instants $T_0$ and $T_1$.

In a variant, it is possible to use the key solely to define the instant $T_0$, requiring the user merely to "click", i.e. to exert a pulse type action on the key, at the moment when the user begins to utter the word. Under such circumstances, the instant $T_1$ (or more precisely $T_1+k_1$) marking the end of analysis is determined automatically by the voice recognition algorithm and will correspond to the matching instant, i.e. the end of the comparison step between the signal as picked up and the various stored voice prints. Under such circumstances, the "KEY PRESS" line in the chart of FIG. 2 corresponds to a single pulse at instant $T_0$.

2) "Hands-free" human factors

The various functions controlled by a single key using the apparatus of the invention are described below with reference to FIG. 3.

These functions which are the main functions to be implemented on a radiotelephone are as follows:

answering an incoming call;

hanging up on a call in progress;

dialing by voice recognition;

dialing by means of the telephone keypad;

swapping between two parties in the event of a call waiting; and swapping between "hands-free" mode (i.e. using the loudspeaker and the microphone of the car kit) and discreet mode (using the earpiece and the microphone of the radiotelephone).

The sequencing of these various functions is illustrated in FIG. 3. Thus:

Answer: in the event of an incoming call, pressing on the key 44 (one click) causes the call to be answered and enables a conversation to be started in "hands-free" mode.

Hang up: this can be triggered by a double-click on the key, if it is desired to hang up without waiting for the other party to hang up at the other end.

Dialing by voice recognition: the above-mentioned sequence: press the key . . . acquire, analyze, and compare the signal . . . release the key . . . look for the number and reproduce the name found as an echo . . . double-click . . . dial the number automatically.

The end of voice recognition depends on one of the three following criteria: (i) the key is released; (ii) silence is detected (dropping below a threshold for a given length of time); (iii) a maximum length of time allocated to the analysis window has terminated.

It will also be observed that in the event of an incoming call arriving during this sequence, recognition is interrupted immediately so as to give priority to the incoming call: even if a name has already been recognized and the apparatus is waiting for confirmation, confirmation is no longer possible; the voice recognition apparatus is inhibited and will only be brought back into operation when the telephone stops ringing or when the user terminates the conversation.

Dialing by means of the telephone keypad: to do this, the user removes the radiotelephone from its support and dials the number on the keypad (or selects a number from a directory of the radiotelephone). Dialing is triggered in the normal way by pressing on the appropriate key of the radiotelephone. Conversation can be established and can be continued in "hands-free" mode when the radiotelephone is put back on its support.

Swapping call waiting: when a caller calls and a conversation is already in progress, a sound signal or a voice message "call waiting" is issued by the loudspeaker of the system. A single press on the key 44 makes it possible to swap from one call to the other. To terminate one or other of the calls, it suffices to double-click, as mentioned above.

Swapping between "hands-free" mode and "discreet" mode: it suffices to remove the radiotelephone from its support, or to put it back again, to go from one mode to the other.

3) Telephone directory management

A radiotelephone contains one or more internal telephone directories, with at least one directory in the SIM card (as defined in GSM technology) and generally at least one directory specific to the telephone itself, independent of the SIM card. These directories are referred to below as "the directory of the radiotelephone".

The apparatus of the invention has its own directory, associated with respective voice prints, so there are two directories present: the directory of the radiotelephone and the directory of the apparatus integrated in the circuit 40 (this directory is referred to as "the car directory").

The invention proposes synchronizing these two directories each time the radiotelephone is put into place on its support.

On first use, when the user places the radiotelephone on the support and turns on the ignition, the device of the invention reads the contents of the directory of the radiotelephone via the connector in the support, and makes a copy which will be stored in the car directory.

Thereafter, the apparatus requests vocabulary training (see below) for the various numbers it has read, so that it can conserve in the memory of the car directory at least one voice print corresponding to each of the numbers.

On each subsequent occasion that the radiotelephone is put into place in the support, the apparatus of the invention re-examines the directory of the radiotelephone, and in the event of a mismatch, gives the user the opportunity of updating the car directory.

In an advantageous variant, the car directory has a plurality of subdirectories each associated with a different user, the user being identified by the number of the radiotelephone (associated with the SIM card). If, when the radiotelephone is put into place in the support, the number of the radiotelephone as read from the SIM card is not recognized by the apparatus, it creates a subdirectory and proceeds as described above to copy the directory of the radiotelephone and to learn the associated voice prints.

However, if it recognizes the number of the radiotelephone, then it selects the subdirectory corresponding to said number and proceeds thereafter with operations solely on the numbers contained in said subdirectory.

This makes it possible for the same car to have a plurality of regular users. Each user is automatically recognized without having to perform any particular selection, and the apparatus thereafter operates as though the user was the only known user, and in particular it does not present the user with numbers belonging to other users.

4) Voice print training

This training stage applies both to learning the prints for the names of parties in the directory and to learning any words in a "vocabulary" for controlling particular functions of the radiotelephone, as described below (message service messages, adjusting sound level, etc.). The term "words" is used both to designate the names of parties and words in the vocabulary.

It is also possible to combine names with words of the predefined vocabulary, for example the name of a corespondent and a keyword such as "home", "office", "fax", "holidays", "mobile", etc. The name then becomes: [name+ optional keyword]. Training for these keywords proceeds in the same manner as for the basic vocabulary of the telephone.

Experience shows that the quality of training is often underestimated in voice recognition apparatuses. In particular:

the user is often a novice while the apparatus is being trained, and therefore speaks with stress in the voice and with other artifacts (hesitation, mouth noises, tongue clicks, etc.);

the vocabulary can be difficult, and can contain names that are similar; and the vocabulary sometimes contains short words that are difficult to recognize.

The invention proposes performing training in several stages.

The first stage is an initial training stage which consists, for each word, in uttering the corresponding word which is then repeated as an echo by the apparatus (if it is a vocabulary word, then the word can also be displayed on the screen of the radiotelephone or on the dashboard).

Preferably, this prior training is performed under noise-free conditions, i.e. when the car is stopped.

The second stage consists in recording a second reference print and in verifying that it matches the first.

For each word, the apparatus utters the word in its memory and asks the user to repeat it. Thereafter, the apparatus calculates the distance (in the voice recognition sense) between the two prints. If the distance is less than a given threshold, then both prints are retained. Otherwise, too great a distance is generally the result of stress in the voice or of an artifact such as a hesitation syllable ("euh . . .") or of a mouth noise, and the user is informed of this anomaly so as to proceed with a new recording.

Optionally, the apparatus also verifies that the distance between the name or word as uttered and other names or words in the directory is sufficiently great, so as to avoid any confusion with any already existing name or word.

Optionally, an additional stage can be provided for tripling or quadrupling the stored voice prints. This stage can optionally be performed, e.g. by drawing a word in random manner and by asking the user to repeat it. The apparatus then verifies that recognition took place properly. In the event of too great a distance between two voice prints, it returns to the initial training stage for the word and it reiterates the training.

Advantageously, in order to detect and eliminate artifacts and hesitations at the beginning of uttering a word or a name in more reliable manner, the apparatus begins by making a special comparison between the beginnings of the words, e.g. by extracting one-eighth of a second at the beginning of each of two recorded words and calculating distance on the basis of these extracts in order to determine whether or not an artifact is present.

It is thus possible to store a large number of voice prints acquired during the initial training stage and then during subsequent repetition stages for verification purposes. These prints can also be recorded while voice recognition is in use, the search being performed, in fact, by making comparisons with a plurality of prints, as described in above-mentioned EP-A-0 650 283, e.g. by means of a vector comparator which enables the various voice recognition calculations to be accelerated.

This enrichment of the vocabulary can be subject to a "successful recognition" criterion. This criterion includes a plurality of subcriteria:

firstly, the noise level must not be too great, otherwise the sample should not be retained as a new voice print;

to inform the apparatus that the uttered word has been successfully recognized, and to conserve it automatically as a new voice print, it can be considered that whenever voice recognition has been followed by dialing being authorized by the user (double-click on the key 44), then the sample was of good quality and can be conserved; and an additional subcriterion can be that a call was indeed set up and that the call was continued for a significant length of time, e.g. not less than 1 minute. This avoids recording new voice prints in the event of a distracted user paying insufficient attention to the echo returned by the device and triggering dialing of a wrong number.

After each "successful recognition" satisfying the above criteria, and in the event of the memory having enough room to enrich its training database, the uttered word is added to the database as a secondary reference associated with the recognized first reference (i.e. the reference that was learnt the first time).

Independently of memory capacity, a maximum number of secondary references is set for each primary reference. The memory is managed in such a manner as to retain primary references on all occasions and to eliminate from the training database any secondary reference which has given rise to recognition that was unsuccessful (within the meaning of the above criterion).

These various rules for managing the voice print database enable it to be made dynamic and to adapt to the environment in which the apparatus is used (level and type of background noise) and to the nature of the vocabulary used (number of vocabulary words compared with memory size and the frequency with which each vocabulary word is used). This adaptation is important for the robustness of the algorithm:

adaptation to the environment: if the apparatus is used often in the presence of a certain type of background noise, the secondary references added to the database will be recorded together with this background noise, thus making it possible to increase the recognition rate in the presence of noise of this type;

adaptation to the nature of the vocabulary: a user having few vocabulary words compared with the size of the memory will benefit from the ability to add numerous secondary references so as to improve the performance of the apparatus. A frequently used vocabulary word will have many secondary references associated therewith and recognition thereof will be facilitated.

5) Voice control of radiotelephone functions

In addition to using the apparatus for searching for a correspondent's name in a directory, it can be advantageous to have a certain number of predefined voice commands, e.g. "call the message service", "delete messages", "consumption", "louder", "quieter", etc.

These voice commands are commands sent to the radiotelephone, or special telephone numbers giving access to specific services (voice message service, news, taxi reservation, etc.), or indeed commands for the car kit.

It is also possible to provide a command with a keyword such as "keypad" for switching to a mode in which dialing is performed digit by digit, the keypad of the telephone then being reactivated.

Some of these voice commands can also be downloaded by the radiotelephone service operator, in the same manner as it is possible to download data into the SIM card or into the radiotelephone terminal.

In addition, the apparatus can interrogate the internal circuits of the terminal and of the SIM via the radiotelephone connector in the support, in order to recognize a certain number of parameters such as the language of the user (data stored in the SIM card), which may be used to cause the apparatus to operate in said language, without it being necessary to ask the user to specify the language, the sound playback level as programmed in the radiotelephone, etc.

In another advantageous improvement of the invention, the voice commands may have been previously recorded by a significant body of speakers, e.g. four men and four women in each of the possible languages, and the corresponding voice prints stored in non-volatile memory. On first use of the word, if the word is recognized and confirmed (e.g. resulting in a call being made and maintained for a predetermined minimum duration), the voice print uttered by the user is conserved in memory. In this way, it is possible in many cases to eliminate the need for a stage of training, which is irksome for the user.

What is claimed is:

1. Voice control apparatus for a radiotelephone, in particular for use in a motor vehicle, the apparatus comprising:

a data memory containing a series of correspondents' call numbers and, for each call number, at least one associated voice print;

a sound transducer suitable for picking up the name of a desired correspondent as uttered by the user of the apparatus;

voice recognition means suitable for analyzing the correspondent's name as picked up by the transducer and for transforming it into an associated voice print;

selective memory addressing means including associative means suitable for finding a voice print in the memory corresponding to the print supplied by the voice recognition means, and in the event of a match, for addressing the corresponding memory position; and means cooperating with the associative means for applying the addressed call number to the radiotelephone circuits;

the voice recognition means comprising:

means capable of evaluating and storing a current noise level as picked up by the transducer in the absence of a speech signal, said noise being picked up continuously by the sound transducer and analyzed to give a weighted mean energy spectrum of the noise, which spectrum is continuously updated;

means capable, in the presence of a speech signal, of subtracting the previously evaluated noise power spectrum from the power spectrum of the signal as picked up; and means capable of applying the resulting signal as obtained in this way to a DTW type voice recognition algorithm with pattern recognition by dynamic programming adapted to speech using dynamic parameter extraction functions, in particular a predictive dynamic algorithm with forward and/or backward and/or frequency masking, further comprising a key actuated by the user and whose actuation controls radiotelephone control functions including answering, hanging up, and swapping during call waiting.

2. Voice control apparatus for a radiotelephone, in particular for use in a motor vehicle, the apparatus comprising:

a data memory containing a series of correspondents' call numbers and, for each call number, at least one associated voice print;

a sound transducer suitable for picking up the name of a desired correspondent as uttered by the user of the apparatus;

voice recognition means suitable for analyzing the correspondent's name as picked up by the transducer and for transforming it into an associated voice print;

selective memory addressing means including associative means suitable for finding a voice print in the memory corresponding to the print supplied by the voice recognition means, and in the event of a match, for addressing the corresponding memory position; and means cooperating with the associative means for applying the addressed call number to the radiotelephone circuits;

the voice recognition means comprising:

means capable of evaluating and storing a current noise level as picked up by the transducer in the absence of a speech signal, said noise being picked up continuously by the sound transducer and analyzed to give a weighted mean energy spectrum of the noise, which spectrum is continuously updated;

means capable, in the presence of a speech signal, of subtracting the previously evaluated noise power spectrum from the power spectrum of the signal as picked up; and means capable of applying the resulting signal as obtained in this way to a DTW type voice recognition algorithm with pattern recognition by dynamic programming adapted to speech using dynamic parameter extraction functions, in particular a predictive dynamic algorithm with forward and/or backward and/or frequency masking, further comprising a key actuated by the user to mark a speech signal, and in which the signal picked up by the transducer is stored continuously over a given time interval ($k_0$) so as to perform voice recognition over a length of time ($[T_0-k_0, T_1+k_1]$) including the period during which said key is actuated ($[T_0, T_1]$) plus said time interval ($k_0$) immediately preceding said actuation.

3. Voice control apparatus for a radiotelephone, in particular for use in a motor vehicle, the apparatus comprising:

a data memory containing a series of correspondents' call numbers and, for each call number, at least one associated voice print;

a sound transducer suitable for picking up the name of a desired correspondent as uttered by the user of the apparatus;

voice recognition means suitable for analyzing the correspondent's name as picked up by the transducer and for transforming it into an associated voice print;

selective memory addressing means including associative means suitable for finding a voice print in the memory corresponding to the print supplied by the voice recognition means, and in the event of a match, for addressing the corresponding memory position; and means cooperating with the associative means for applying the addressed call number to the radiotelephone circuits;

the voice recognition means comprising:

means capable of evaluating and storing a current noise level as picked up by the transducer in the absence of a speech signal, said noise being picked up continuously by the sound transducer and analyzed to give a weighted mean energy spectrum of the noise, which spectrum is continuously updated;

means capable, in the presence of a speech signal, of subtracting the previously evaluated noise power spectrum from the power spectrum of the signal as picked up; and means capable of applying the resulting signal as obtained in this way to a DTW type voice recognition algorithm with pattern recognition by dynamic programming adapted to speech using dynamic parameter extraction functions, in particular a predictive dynamic algorithm with forward and/or backward and/or frequency masking, further comprising a key actuated by the user to mark a speech signal, and in which voice recognition is performed over a length of time ($[T_0-k_0, T_1+k_1]$) terminating after the end ($T_1$) of actuation of the key.

* * * * *